(12) United States Patent
Xiao et al.

(10) Patent No.: US 12,067,927 B2
(45) Date of Patent: Aug. 20, 2024

(54) DISPLAY APPARATUS AND MOBILE TERMINAL

(71) Applicant: TCL China Star Optoelectronics Technology Co., Ltd., Guangdong (CN)

(72) Inventors: Guangxing Xiao, Guangdong (CN); Yuhua Chang, Guangdong (CN); Yu Wu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/600,309

(22) PCT Filed: Aug. 18, 2021

(86) PCT No.: PCT/CN2021/113277
§ 371 (c)(1),
(2) Date: Feb. 16, 2023

(87) PCT Pub. No.: WO2023/015583
PCT Pub. Date: Feb. 16, 2023

(65) Prior Publication Data
US 2024/0021138 A1  Jan. 18, 2024

(30) Foreign Application Priority Data
Aug. 9, 2021 (CN) .................. 202110907723.X

(51) Int. Cl.
*G09G 3/20* (2006.01)

(52) U.S. Cl.
CPC ... *G09G 3/2096* (2013.01); *G09G 2340/0428* (2013.01); *G09G 2370/08* (2013.01)

(58) Field of Classification Search
CPC ......... G09G 3/2096; G09G 2340/0428; G09G 2370/08; G09G 3/3648; G09G 3/20; G06F 3/147
See application file for complete search history.

(56) References Cited

U.S. PATENT DOCUMENTS

2014/0160109 A1   6/2014 Chen
2018/0182288 A1*  6/2018 Kim .................. G09G 3/2059
(Continued)

FOREIGN PATENT DOCUMENTS

CN    1885395     12/2006
CN    101174064    5/2008
(Continued)

OTHER PUBLICATIONS

International Search Report and the Written Opinion Dated May 6, 2022 From the International Searching Authority Re. Application No. PCT/CN2021/113277 and Its Translation Into English. (15 Pages).

(Continued)

*Primary Examiner* — Brent D Castiaux

(57) ABSTRACT

A display apparatus and a mobile terminal are provided. The display apparatus includes a display panel, N2 data drives, and a timing controller. Video data can be transmitted to a plurality of input video interfaces corresponding to the data drives in a time-sharing manner using one output video interface of the timing controller. Therefore, a timing controller with relatively low resolution can be matched with a display panel with relatively high resolution, thereby reducing overall costs of the display apparatus.

18 Claims, 1 Drawing Sheet

(56) References Cited

U.S. PATENT DOCUMENTS

| | | | | |
|---|---|---|---|---|
| 2018/0219025 A1* | 8/2018 | Takahashi | ............ | G09G 3/3659 |
| 2019/0066565 A1* | 2/2019 | Guo | ..................... | G09G 3/2003 |
| 2020/0380902 A1* | 12/2020 | Chen | ........................ | G09G 3/20 |

FOREIGN PATENT DOCUMENTS

| | | |
|---|---|---|
| CN | 102568420 | 7/2012 |
| CN | 102915709 | 2/2013 |
| CN | 103377614 | 10/2013 |
| CN | 103544926 | 1/2014 |
| CN | 105721818 | 6/2016 |
| CN | 106292112 | 1/2017 |
| CN | 111261123 | 6/2020 |
| JP | 2021-022773 | 2/2021 |

OTHER PUBLICATIONS

Notification of Office Action and Search Report Dated May 11, 2023 From the State Intellectual Property Office of the People's Republic of China Re. Application No. 202110907723.X and Its Translation Into English. (16 Pages).

* cited by examiner

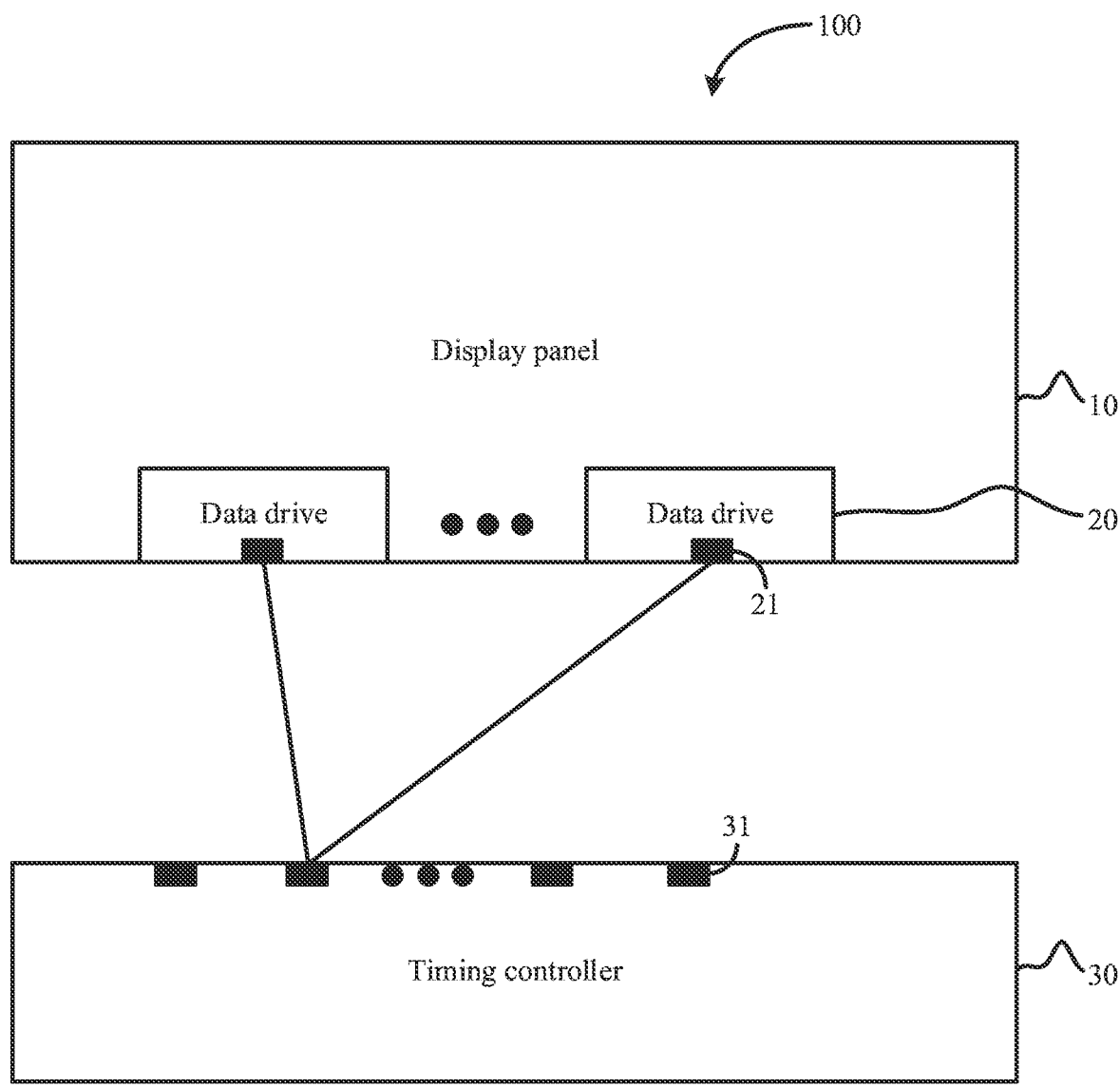

DISPLAY APPARATUS AND MOBILE TERMINAL

RELATED APPLICATIONS

This application is a National Phase of PCT Patent Application No. PCT/CN2021/113277 having International filing date of Aug. 18, 2021, which claims the benefit of priority of Chinese Patent Application No. 202110907723.X filed on Aug. 9, 2021. The contents of the above applications are all incorporated by reference as if fully set forth herein in their entirety.

FIELD AND BACKGROUND OF THE INVENTION

The present disclosure relates to the field of display technologies, and specifically, to a display apparatus and a mobile terminal.

In a conventional technical solution, resolution of a timing controller requires to be greater than or equal to resolution of a display panel. However, higher resolution of a timing controller indicates higher purchase costs. In this way, manufacturing costs of a display apparatus are increased.

It should be noted that, the above descriptions of the background of invention are merely for ease of clearly and completely understanding the technical solutions of the present disclosure. Therefore, the technical solutions involved above cannot be considered known to a person skilled in the art merely because the technical solutions appear in the background of invention of the present disclosure.

SUMMARY OF THE INVENTION

The present disclosure provides a display apparatus and a mobile terminal, to alleviate the technical problem that resolution of a timing controller requires to be greater than or equal to resolution of a display panel in a display apparatus.

In a first aspect, the present disclosure provides a display apparatus, including: a display panel, N2 data drives, and a timing controller. Resolution of the display panel is A*B, A is a number of pixel rows, B is a number of pixel columns, and both A and B are positive integers. The N2 data drives are electrically connected to the display panel, wherein each data drive includes an input video interface, a rate of each input video interface is M2 Gbps, and N2 is a positive integer. Resolution of the timing controller is C*D. C is a number of each row of pixel data. D is a number of each column of pixel data. Both C and D are positive integers. C is less than A. D is less than B. The timing controller includes N1 output video interfaces. A rate of each output video interface is M1 Gbps, and each output video interface transmits video data to a plurality of input video interfaces in a time-sharing manner.

In some implementations, each output video interface transmits video data to E input video interfaces in a time-sharing manner. E is determined according to the following formula: E=M2*N2/(J*K)/(M1*N1), wherein J=B/D, K=A/C, and both J and K are positive integers.

In some implementations, the data drives include a mirror unit, configured to copy one piece of pixel data to K pieces of pixel data.

In some implementations, the display panel includes a plurality of data lines and a plurality of scanning lines, wherein one data line is electrically connected to one pixel column, and one scanning line is electrically connected to at least J pixel rows.

In some implementations, the input video interfaces are point-to-point (P2P) video interfaces or low-voltage differential video interfaces.

In some implementations, the output video interfaces have a same type as that of the input video interfaces.

In some implementations, E is a positive integer greater than or equal to 2.

In some implementations, if a calculation result of M2*N2/(J*K)/(M1*N1) is not a positive integer, E is an integer part of the calculation result.

In some implementations, the resolution of the display panel is 7680*4320, and the resolution of the timing controller is 3840*2160.

In a second aspect, the present disclosure provides a mobile terminal, including the display apparatus according to any one of the implementations above and a terminal body, wherein the terminal body is integrated with the display apparatus.

The display apparatus and the mobile terminal provided in the present disclosure can transmit video data to the plurality of input video interfaces corresponding to the data drives in a time-sharing manner using one output video interface of the timing controller. Therefore, a timing controller with relatively low resolution can be matched with a display panel with relatively high resolution, thereby reducing overall costs of the display apparatus.

BRIEF DESCRIPTION OF THE SEVERAL VIEWS OF THE DRAWINGS

FIG. 1 is a schematic diagram of a structure of a display apparatus according to an embodiment of the present disclosure.

DESCRIPTION OF SPECIFIC EMBODIMENTS OF THE INVENTION

To make the objectives, the technical solutions, and the effects of the present disclosure clearer and more unambiguous, the present disclosure is further described below in detail with reference to the accompanying drawings and embodiments. It is to be understood that the detailed embodiments described herein are merely used for explaining the present disclosure, but are not intended to limit the present disclosure.

As shown in FIG. 1, the present embodiment provides a display apparatus 100, including: a display panel 10, N2 data drives 20, and a timing controller 30. Resolution of the display panel 10 is A*B. A is a number of pixel rows, B is a number of pixel columns, and both A and B are positive integers. The N2 data drives 20 are electrically connected to the display panel 10, wherein each data drive 20 includes an input video interface 21, a rate of each input video interface 21 is M2 Gbps, and N2 is a positive integer. Resolution of the timing controller 30 is C*D. C is a number of each row of pixel data. D is a number of each column of pixel data. Both C and D are positive integers. C is less than A. D is less than B. The timing controller 30 includes N1 output video interfaces 31. A rate of each output video interface 31 is M1 Gbps, and each output video interface 31 transmits video data to a plurality of input video interfaces 21 in a time-sharing manner.

It may be understood that the display apparatus 100 provided in the present embodiment may transmit video data to the plurality of input video interfaces 21 corresponding to the data drives 20 in a time-sharing manner using one output video interface 31 of the timing controller 30. Therefore, the timing controller 30 with relatively low resolution may be matched with the display panel 10 with relatively high resolution, thereby reducing overall costs of the display apparatus 100.

It is to be noted that, the timing controller 30 may communicate with a plurality of data drives 20 based on a P2P protocol. It may be understood that, based on control of the P2P protocol, the timing controller 30 may implement time-sharing transmission of video data, which is a conventional technology and is not described in detail herein. In addition, the data drives 20 can alternatively be configured with corresponding function pins, to control the plurality of data drives 20 connected to a same output video interface 31 to receive video data in a time-sharing manner. Alternatively, the time-sharing transmission of the timing controller 30 and time-sharing receiving of the plurality of data drivers 20 may be matched and combined, to transmit video data to the corresponding data drivers 20 more accurately in a time-sharing manner.

It may be understood that, in the present embodiment, a piece of pixel data corresponds to a pixel. One frame of video data outputted by the timing controller 30 may include C*D pixel data. As the resolution of the timing controller 30 increases, C and/or D increases correspondingly.

In an embodiment, each output video interface 31 transmits video data to E input video interfaces 21 in a time-sharing manner. E is determined according to the following formula: $E=M2*N2/(J*K)/(M1*N1)$, wherein $J=B/D$, $K=A/C$, and both J and K are positive integers.

It is to be noted that, in the present embodiment, the same output video interface 31 may be cascaded or connected to E data drives 20. The E data drives 20 may receive corresponding video data in a time-sharing manner to generate corresponding pixel data, and output corresponding data signals to corresponding pixels.

B may be an integer multiple of D, and A may be an integer multiple of C. It may be understood that, A being greater than C, and/or, B being greater than D, indicates that in the present embodiment, the timing controller 30 with lower resolution may be matched with the display panel 10 with higher resolution. Correspondingly, purchase costs of the timing controller 30 are lower.

In an embodiment, E is a positive integer greater than or equal to 2.

In an embodiment, if a calculation result of $M2*N2/(J*K)/(M1*N1)$ is not a positive integer, E is an integer part of the calculation result.

It may be understood that, in some matching between an output rate and the resolution of the timing controller 30 and an input rate and the resolution of the display panel 10, the calculation result of $M2*N2/(J*K)/(M1*N1)$ may not be a positive integer. In this case, considering load balance of the timing controller 30, the integer part of the calculation result may be used to configure a number of data drivers 20 that may be connected to an output video interface 31.

In an embodiment, the data drives 20 include a mirror unit, configured to copy one piece of pixel data to K pieces of pixel data.

It is to be noted that, in some cases that a number of pixels in the video data directly outputted by the timing controller 30 cannot satisfy requirements of the display panel 10, more pixel data may be generated using the mirror unit in the present embodiment, to satisfy display requirements of the display panel 10 for pixel data.

In an embodiment, the display panel 10 includes a plurality of data lines and a plurality of scanning lines, wherein one data line is electrically connected to one pixel column, and one scanning line is electrically connected to at least J pixel rows.

It may be understood that, in the present embodiment, a same scanning line may drive at least one pixel row synchronously, which may not only reduce a number of scanning lines used, but also improve efficiency of writing the data signals to the corresponding pixels.

In an embodiment, the input video interfaces 21 are P2P video interfaces or low-voltage differential video interfaces.

In an embodiment, the output video interfaces 31 have a same type as that of the input video interfaces 21.

In an embodiment, the resolution of the display panel 10 is 7680*4320, and the resolution of the timing controller 30 is 3840*2160. The timing controller 30 may output 60 Hz video data. N1 may be 12. A refresh rate of the display panel 10 may be 60 Hz. A number (N2) of the data drives 20 may be 24.

In an embodiment, the data drives 20 may alternatively be included in the display panel 10.

In an embodiment, the present embodiment provides a mobile terminal, including a terminal body and the display apparatus 100 according to any one of the embodiments above, wherein the terminal body is integrated with the display apparatus 100.

It may be understood that, the mobile terminal provided in the present embodiment may transmit video data to the plurality of input video interfaces 21 corresponding to the data drives 20 in a time-sharing manner using one output video interface 31 of the timing controller 30. Therefore, the timing controller 30 with relatively low resolution may be matched with the display panel 10 with relatively high resolution, thereby reducing overall costs of the display apparatus 100.

It is to be noted that, the mobile terminal may be but is not limited to a mobile phone, and the terminal body may be a mobile phone part other than the display apparatus 100. The mobile terminal may alternatively be another electronic device, for example, a vehicle display terminal, a tablet computer, a desktop computer, and the like.

It is to be noted that, the display panel 10 in the above embodiments may be but is not limited to a liquid crystal panel. The liquid crystal panel includes: a polarizer, a glass substrate, a black matrix, a color filter, a protective film, a common electrode, a calibration layer, a liquid crystal layer (liquid crystal, spacer, and sealant), a capacitor, a display electrode, a prism layer, and a light scattering layer.

The polarizer is divided into an upper polarizer and a lower polarizer. The upper and lower polarizers have polarization functions perpendicular to each other, and act like a fence to block a light wave component as required. For example, a light wave component perpendicular to a polarizer fence is blocked out, and only a light wave component parallel to the polarizer fence is allowed to pass through.

The glass substrate can be divided into an upper substrate and a lower substrate in a liquid crystal display (LCD). A main function of the glass substrate is to clamp liquid crystal materials in a gap between the two substrates. Heat-resistant and chemical-resistant alkali-free borosilicate glass with excellent mechanical properties is usually used as a glass substrate material. As for a thin film transistor LCD (TFT-LCD), one layer of glass substrate is distributed with a TFT, and another layer of glass substrate is deposited with a color filter.

The black matrix uses materials with high shading properties to separate three primary colors that are red, green, and blue in the color filter (to prevent color mixing) and prevent light leakage, thereby improving contrast of each color block. In addition, in the TFT-LCD, the black matrix can further cover internal electrode wiring or the TFT.

A function of the color filter is to generate light of three primary colors that are red, green, and blue, to achieve full-color display of the LCD.

A function of an alignment layer is to enable liquid crystal molecules to be arranged and aligned evenly at a microscopic level.

A transparent electrode is divided into a common electrode and a pixel electrode. An input signal voltage is exactly loaded between the pixel electrode and the common electrode. The transparent electrode usually forms a transparent conductive layer by depositing indium tin oxide (ITO) materials on the glass substrate.

A liquid crystal material acts like a light valve in the LCD, which may control brightness of transmitted light to achieve an information display effect.

A driver integrated circuit (IC) is actually a set of IC chip apparatus configured to adjust and control a phase, a peak value, a frequency, and the like of a potential signal on the transparent electrode, establish a driving electric field, and finally realize the information display of the liquid crystal.

In the liquid crystal panel, an active matrix LCD screen is formed by sealing twisted nematic (TN) liquid crystal materials between the two glass substrates. The upper glass substrate close to the display screen is deposited with the color filters of three primary colors that are red, green, and blue (RGB), the black matrix, and the transparent common electrode. The lower glass substrate (the substrate relatively away from the display screen) is provided with a TFT device, a transparent pixel electrode, a storage capacitor, a grid line, a signal line, and the like. The alignment layer is disposed on an inner side of the two glass substrates, to directionally align the liquid crystal molecules. Between the two glass substrates, the liquid crystal materials are perfused and spacers are spread to ensure uniformity of the gap. A periphery is bonded by frame sealing adhesive, providing a sealing effect. Common electrodes of the upper and lower glass substrates are connected by a silver colloidal dispensing process.

Polarizers are separately pasted on outer sides of the upper and lower glass substrates. When a voltage is applied between the transparent pixel electrode and the transparent common electrode, an arrangement state of the liquid crystal molecules will change. In this case, intensity of incident light passing through the liquid crystal changes accordingly. The LCD achieves information display exactly based on optical activity of the liquid crystal materials coupled with control of the electric field.

LCD products are non-active light-emitting electronic devices that do not have light-emitting characteristics. LCD products require to rely on emission of a light source in a backlight module to obtain display performance. Therefore, brightness of the LCD is determined by the backlight module. As can be seen, performance of the backlight module directly affects a display quality of the liquid crystal panel.

The backlight module includes a lighting source, a reflector sheet, a light guide plate, a diffuser, a brightness enhancement film (prism film), a frame, and the like. Backlight modules used in LCDs may be mainly divided into two categories that are edge-lit backlight modules and direct-lit backlight modules. Mobile phones, notebook computers, and monitors (15 inches) mainly use the edge-lit backlight modules, while LCD televisions (TVs) mostly use the direct-lit backlight module light source. A backlight module light source mainly uses a cold cathode fluorescent lamp (CCFL) and a light emitting diode (LED) light source as a backlight for an LCD.

A main function of the reflector sheet is to completely send light emitted by the light source into the light guide plate, reducing useless loss as much as possible.

A main function of the light guide plate is to guide light emitted by a side light source to a front surface of the panel.

A prism film is also referred to as a brightness enhancement film. A main function of the prism film is to concentrate each scattering light ray at a certain angle through refraction and total internal reflection of the diaphragm layer, and then emit the scattering light from the backlight, providing a screen-brightened display effect.

A main function of the diffuser is to modify edge light of the backlight module into a uniform area light, to achieve an optical diffusion effect. The diffuser is divided into an upper diffuser and a lower diffuser. The upper diffuser is located between the prism film and liquid crystal components, and is closer to the display panel. The lower diffuser is located between the light guide plate and the prism film, and is closer to the backlight.

The LCD is a display using liquid crystal as a material. Liquid crystal is a kind of organic compound intermediate between solid and liquid. Under normal temperature conditions, liquid crystal shows both fluidity of liquid and optical anisotropy of crystals. Liquid crystal becomes transparent liquid when heated, and becomes a crystalline turbid solid after cooling.

By the effect of the electric field, the liquid crystal molecules make changes in arrangement, thereby causing an incident light beam to pass through the liquid crystal and make changes in intensity. The changes in light intensity are further shown as changes in brightness by the effect of the polarizer. On this basis, by controlling the liquid crystal electric field, light brightness changing can be implemented, thereby realizing information display. Therefore, the liquid crystal materials act like many little "light valves".

There is a control circuit and a drive circuit around the liquid crystal materials. Therefore, when the electrodes in the LCD generate an electric field, the liquid crystal molecules twist. In this way, light passing through the liquid crystal molecules is regularly refracted (the optical activity of the liquid crystal materials), and then displayed on the screen after filtering of a second layer of polarizer.

It is to be noted that, since the liquid crystal materials are not light-emitting, an additional light source is usually required to be provided for the display panel in the LCD. A main light source system is referred to as the "backlight module". A backlight plate is made of fluorescent substance, which can emit light. A main function of the backlight plate is to provide a uniform backlight.

The LCD technology perfuses the liquid crystal between two planes with a plurality of fine grooves. The plurality of grooves on the two planes are perpendicular to each other (intersect at 90 degrees). That is, if molecules on one plane are arranged in a north-south direction, molecules on another plane are arranged in a west-east direction. Molecules located between the two planes are forced into a 90-degree twisted state. Since the light is spread in an arrangement direction of the molecules, the light is also twisted at 90 degrees when passing through the liquid crystal. When a voltage is applied to the liquid crystal, the liquid crystal molecules rotate to change light transmittance, thereby realizing multi-gray scale display.

The LCD usually includes two polarizers perpendicular to each other. The polarizers act like fences to block a light wave component as required. For example, a light wave component perpendicular to polarizer fences is blocked out, and only a light wave component parallel to the polarizer fences is allowed to pass through. Natural light radiates randomly in all directions. Under normal conditions, the two polarizers perpendicular to each other should block all natural light trying to pass through. However, twisted liquid crystal fills between the two polarizers. Therefore, after passing through the first polarizer, the light is twisted by 90 degrees by the liquid crystal molecules, and finally passes through the second polarizer.

For notebook computers or desktop LEDs, more complex color displays are required.

As for a color LCD, a color filter layer specifically used to process color display is further required. That is, the so-called "color filter". In a color LCD panel, each pixel usually includes 3 liquid crystal cells. There are three color filters of red, green, or blue (RGB) respectively in front of each cell. In this way, light passing through different cells may be displayed as different colors on the screen.

The color filter, the black matrix, and the transparent common electrode are usually deposited on an upper glass substrate of the display screen. The color LCD can create a colorful image in a high-resolution environment.

Human visual organs (eyes) perceive dynamic images with the phenomenon of so-called "persistence of vision". That is, high-speed moving images will form a short-lived impression in human brains. Cartoons and movies in early times and even the latest game shows exactly apply the principle of "persistence of vision", to display a series of gradually-varied images in front of human eyes in rapid succession, so as to form dynamic images.

When a plurality of images are generated at a speed exceeding 24 frames/s, human eyes will perceive continuous images. That is also the origin of the movie playback speed of 24 frames per second. If a display speed is lower than this standard, people will obviously feel the pause of the images and discomfort. Calculated according to this index, display time of each image is required to be less than 40 ms. To display fast moving images with high definition, a general image motion speed exceeds 60 frames/s. That is, an interval time between each frame of the moving images is 16.67 ms.

If a response time of the liquid crystal is longer than the interval time between each frame, people will feel that the screen is blurry when watching the fast moving images. A response time is a special index of the LCD. The response time of the LCD refers to a speed at which each pixel of the display reacts to an input signal, that is, refers to a response time for the liquid crystal to turn "from dark to bright" or "from bright to dark". The response time is required to be as short as possible. Only sufficiently short response time can ensure coherence of the images. If the response time is too long, streaking is likely to occur when the LCD displays dynamic images. The response time of the LCD is usually 2 ms to 5 ms.

The TFT refers to a transistor array on the glass substrates of the liquid crystal panel, so that each pixel of the LCD is provided with a own semiconductor switch. Each pixel may control the liquid crystal between the two glass substrates through electric pulses. That is, independent and precise "P2P" control over each pixel is implemented through an active switch. Therefore, each node of the pixel is relatively independent, and may be continuously controlled.

The TFT LCD mainly includes the glass substrates, a gate, a drain, a source, a semiconductor active layer (amorphous silicon (a-Si)), and the like.

A TFT array is usually deposited, together with the transparent pixel electrode, the storage capacitor, the grid line, the signal line, and the like, on a lower glass substrate (the substrate relatively away from the display screen) of the display. Configuration of such a transistor array increases a response speed of the liquid crystal display screen, and may further control display gray scale, thereby ensuring a more realistic image color and a more pleasing image quality of the LCD. Therefore, most LCDs and LCD-TVs, and some mobile phones are driven by the TFT. Whether a small and medium-sized LCD adopting a narrow viewing angle TN mode, or a large-sized LCD-TV adopting a wide viewing angle in-plane switching (IPS) mode is commonly referred to as "TFT-LCD".

The display panel 10 in the above embodiments may alternatively be an organic light emitting diode (OLED) display screen, which is a display screen made of organic electronic LEDs. Provided with an organic electronic LED, the OLED display screen does not require a backlight, and has the following excellent characteristics of high contrast, small thickness, wide viewing angle, fast response speed, applicability to flexible panels, wide operating temperature range, and simple structure and manufacturing process.

Therefore, the OLED display are becoming increasingly common, most notably in products, such as mobile phones, media players, and small entry-level TVs. Unlike standard LCDs, OLED pixels are driven by a current source.

The OLED display adopts a self-luminous display technology and does not require any backlight at all. Materials used in OLEDs are organic materials suitable for chemical structures. The OLED technology relies on a current to control driving. The OLED has electrical characteristics quite similar to the standard LED whose brightness depends on an LED current. In order to turn on and off the OLED and to control an OLED current, a TFT control circuit is required.

In an advanced energy-saving mode, a highest efficiency can be achieved as with any battery-powered device. Relatively long battery standby time can only be achieved when a converter is operating at the highest efficiency of an overall load current range, which is especially important for the OLED display. The OLED display consumes the most power when being fully white, and the current is relatively small for any other display colors. This is because only white requires all the red, green, and blue sub-pixels to be fully bright. For example, a 2.7-inch display requires 80 mA of current to display a full-white image, but only requires 5 mA of current to display other icons or graphics. Therefore, the OLED power supply requires to achieve high converter efficiency for all load currents. In order to achieve such efficiency, the advanced energy-saving mode technology is required to reduce the load current and switching frequency of the converter. Since this is done through a voltage-controlled oscillator (VCO), possible electromagnetic interference (EMI) problems can be minimized. In addition, a lowest switching frequency can be controlled beyond a general audio range of 40 kHz, which can avoid noise generated by a ceramic input or output capacitor. It is particularly important and can simplify a design process for this type of device to be used in a mobile phone application.

In terms of luminous characteristics, white light does not consume the most power. Power consumption is determined by a brightness value. For example, red, blue, and green light with a brightness value of 10 respectively will produce white light with a brightness value of 30. Therefore, the brightness values of the red, blue, and green lights are respectively adjusted to 3.3 to synthesize a white light brightness value (a theoretical value) of 10. In terms of the LED or OLED, for human eyes to see the same brightness, blue light consumes the most power.

Organic light-emitting display technology utilizes very thin organic material coatings and glass substrates. These organic materials emit light as an electric charge passes through. An OLED light color depends on the material of an organic light-emitting layer, so manufacturers may change the material of the light-emitting layer to obtain a desired color. An active array organic light-emitting display has a built-in electronic circuit system, so each pixel is independently driven by a corresponding circuit. The OLED has the following advantages of simple structure, self-illumination without backlight, high contrast, small thickness, wide viewing angle, fast response speed, applicability to flexible panels, wide operating temperature range, and the like. The OLED technology provides the best manner of viewing photos and videos, and poses relatively few restrictions on camera design.

The LCD technology has gradually begun to be applied to the field of vehicle display. However, affected by ambient temperatures, application of the LCD technology in vehicle display products is limited. The liquid crystal material used to make the LCD becomes liquid when the ambient temperature is too high, and becomes crystal when the temperature is too low. No matter which state it is in, the liquid crystal material can no longer provide a photoelectric effect that can be controlled by the electric field. As a result, the LCD cannot work normally. In addition, the contrast, viewing angle, and response speed of the LCD also change as the temperature changes. Therefore, the liquid crystal is not a good display method for vehicle displays with large environmental changes.

Compared with the mature TFT-LCD, the OLED (organic electroluminescence display technology) is an active luminous display with high contrast, wide viewing angle (up to 170°), fast response (~1 μs), high luminous efficiency, low operating voltage (3V to 10V), ultra-light weight and ultra-small thickness (thickness less than 2 mm), and other advantages. Vehicle displays made using the OLED technology may have a lighter, thinner, and attractive appearance, a better color display quality, a wider viewing range, and greater design flexibility. More importantly, environmental adaptability of the OLED is far superior to that of the LCD. A range of tolerable temperature is from −40° C. to 85° C. In addition, the OLED does not contain lead, which will not pollute the environment. Therefore, the OLED has great advantages to be applied to the vehicle display field.

Due to the above advantages, in the commercial field, OLED display screens may be applied to point of sales (POS) terminals, automated teller machines (ATMs), copiers, game machines, and the like. In the communication field, the OLED display screens may be applied to mobile phones, mobile network terminals, and the like. In the computer field, the OLED display screens may be widely used in personal digital assistants (PDAs), commercial personal computers (PCs), home PCs, and notebook computers. In the consumer electronics field, the OLED display screens may be applied to audio equipment, digital cameras, and portable DVDs. In the industrial application field, the OLED display screens can be applied to instruments, and the like. In the transportation field, the OLED display screens are used in global position system (GPS) and aircraft instruments.

A flexible screen refers to a flexible OLED. The successful mass production of flexible screens is not only beneficial to the manufacturing of a new generation of high-end smart phones, but also has a profound influence on the application of wearable devices due to the low power consumption and flexibility. In the future, flexible screens will be widely used with the continuous popularity of personal smart terminals.

A flexible screen mobile phone refers to a mobile phone with a bendable and flexible screen. Looking like a roll-up, the flexible screen mobile phone is also called a roll-up phone.

OLEDs are very thin and can be mounted on flexible materials, such as plastic or metal foil. Using plastic instead of glass will make the display screen more durable and lighter. A flexible OLED panel is concave from top to bottom, with a bending radius of up to 700 mm.

The OLED panel utilizes a plastic substrate instead of a common glass substrate. Using the thin film packaging technology and with a protective film pasted on the back of the panel, the panel is bendable and not easy to break. The flexible screen can be rolled, but is not foldable. Future products may be foldable and have more varied appearances.

The display screen is cut from the panel. The bendable display screen, also known as the flexible screen, is regarded as a product of the initial stage of the display screen revolution, whose ultimate goal is to transform mobile and wearable electronic devices.

An OLED preparation solution is to use the vacuum evaporation technology to prepare an organic functional layer and a cathode layer, which requires expensive evaporation equipment. This leads to high production costs and low production efficiency. In addition, limited by the size of the vacuum evaporation equipment, it is difficult to realize the preparation of large-area display screens. Compared with vacuum thermal evaporation, preparation by solution method has the advantages of simple operation and low costs. The preparation by solution method is suitable for low temperature or indoor temperature conditions, and especially for the preparation of large-size OLED screens. With the rapid iteration of organic electronics technology, the liquid phase processing technology of soluble organic materials has become increasingly mature. The liquid phase method, especially the printing process, to prepare OLEDs is considered one of the key methods to solve the bottleneck of the existing OLED development.

It may be understood that, for a person of ordinary skill in the art, equivalent substitutions or changes can be made according to the technical solutions of the present disclosure and the inventive concept thereof, and all these changes or substitutions shall fall within the protection scope of the appended claims of the present disclosure.

What is claimed is:

1. A display apparatus, comprising:
    a display panel, wherein resolution of the display panel is A*B, A is a number of pixel rows, B is a number of pixel columns, and both A and B are positive integers;
    N2 data drives, electrically connected to the display panel, wherein each data drive comprises an input video interface, a rate of each input video interface is M2 Gbps, and N2 is a positive integer; and
    a timing controller, wherein resolution of the timing controller is C*D, C is a number of each row of pixel data, D is a number of each column of pixel data, both C and D are positive integers, C is less than A, D is less than B, the timing controller comprises N1 output video interfaces, a rate of each output video interface is M1 Gbps, and each output video interface transmits video data to a plurality of input video interfaces in a time-sharing manner;

wherein each output video interface transmits video data to E input video interfaces in a time-sharing manner, and E is determined according to the following formula:

$$E=M2*N2/(J*K)/(M1*N1),$$

wherein J=B/D, K=A/C, and both J and K are positive integers.

2. The display apparatus as claimed in claim 1, wherein the data drives comprise: a mirror unit, configured to copy one piece of pixel data to K pieces of pixel data.

3. The display apparatus as claimed in claim 2, wherein the display panel comprises:
   a plurality of data lines, wherein one data line is electrically connected to one pixel column; and
   a plurality of scanning lines, wherein one scanning line is electrically connected to at least J pixel rows.

4. The display apparatus as claimed in claim 1, wherein the input video interfaces are point-to-point (P2P) video interfaces or low-voltage differential video interfaces.

5. The display apparatus as claimed in claim 4, wherein the output video interfaces have a same type as that of the input video interfaces.

6. The display apparatus as claimed in claim 1, wherein E is a positive integer greater than or equal to 2.

7. The display apparatus as claimed in claim 1, wherein if a calculation result of M2*N2/(J*K)/(M1*N1) is not an integer, E is an integer part of the calculation result.

8. The display apparatus as claimed in claim 1, wherein a resolution of the display panel is 7680*4320, and a resolution of the timing controller is 3840*2160.

9. A mobile terminal, comprising:
   the display apparatus as claimed in claim 1; and
   a terminal body integrated with the display apparatus.

10. The mobile terminal as claimed in claim 9, wherein the data drives comprise: a mirror unit, configured to copy one piece of pixel data to K pieces of pixel data.

11. The mobile terminal as claimed in claim 10, wherein the display panel comprises:
   a plurality of data lines, wherein one data line is electrically connected to one pixel column; and
   a plurality of scanning lines, wherein one scanning line is electrically connected to at least J pixel rows.

12. The mobile terminal as claimed in claim 9, wherein the input video interfaces are point-to-point video interfaces or low-voltage differential video interfaces.

13. The mobile terminal as claimed in claim 12, wherein the output video interfaces have a same type as that of the input video interfaces.

14. The mobile terminal as claimed in claim 9, wherein E is a positive integer greater than or equal to 2.

15. The mobile terminal as claimed in claim 9, wherein if a calculation result of M2*N2/(J*K)/(M1*N1) is not an integer, E is an integer part of the calculation result.

16. The mobile terminal as claimed in claim 9, wherein a resolution of the display panel is 7680*4320, and a resolution of the timing controller is 3840*2160.

17. The mobile terminal as claimed in claim 9, wherein the display panel is a liquid crystal display (LCD) panel or an organic light emitting diode (OLED) display.

18. The mobile terminal as claimed in claim 9, wherein the mobile terminal is a mobile phone or a tablet computer.

* * * * *